United States Patent
Sloane et al.

(10) Patent No.: US 12,095,754 B2
(45) Date of Patent: Sep. 17, 2024

(54) SYSTEM AND METHOD FOR ESTABLISHING A SECURE SESSION TO AUTHENTICATE DNS REQUESTS VIA DYNAMICALLY CONFIGURABLE TRUSTED NETWORK INTERFACE CONTROLLERS

(71) Applicant: BANK OF AMERICA CORPORATION, Charlotte, NC (US)

(72) Inventors: Brandon Sloane, Indian Land, SC (US); Lauren Jenae Alibey, Charlotte, NC (US); Sophie Morgan Danielpour, Durham, NC (US); Jinyoung Nathan Kim, Charlotte, NC (US); James Thomas MacAulay, Erie, CO (US); Serge Alejandro Neri, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 241 days.

(21) Appl. No.: 17/725,044

(22) Filed: Apr. 20, 2022

(65) Prior Publication Data
US 2023/0344812 A1    Oct. 26, 2023

(51) Int. Cl.
*H04L 9/40*    (2022.01)

(52) U.S. Cl.
CPC .......... *H04L 63/08* (2013.01); *H04L 63/0428* (2013.01)

(58) Field of Classification Search
CPC .............................. H04L 63/08; H04L 63/0428
See application file for complete search history.

(56) References Cited

U.S. PATENT DOCUMENTS

| | | | | |
|---|---|---|---|---|
| 8,151,325 B1* | 4/2012 | Bennett, III | .......... | H04L 69/167 713/168 |
| 8,352,725 B1* | 1/2013 | O'Toole, Jr. | .......... | H04L 63/061 713/151 |
| 8,656,471 B1* | 2/2014 | Allen | ...................... | H04L 63/08 726/19 |
| 8,996,873 B1* | 3/2015 | Pahl | ...................... | H04L 67/01 713/168 |
| 9,191,374 B1* | 11/2015 | Kim | ...................... | H04L 67/60 |
| 9,270,449 B1* | 2/2016 | Tribble | ............... | H04L 63/0435 |
| 9,438,618 B1* | 9/2016 | Sultan | ...................... | G06F 21/53 |
| 9,661,083 B1* | 5/2017 | Eykholt | ................ | H04L 67/147 |
| 9,692,640 B1* | 6/2017 | Veladanda | .......... | H04L 41/0803 |
| 9,967,292 B1* | 5/2018 | Higgins | .................. | H04L 63/30 |

(Continued)

*Primary Examiner* — Aravind K Moorthy
(74) *Attorney, Agent, or Firm* — Moore & Van Allen PLLC; Nicholas C. Russell

(57) ABSTRACT

Embodiments of the present invention provide a system for establishing a secure session to authenticate DNS requests via dynamically configurable trusted network interface controllers. The system is configured for receiving a DNS request from a first device, wherein the DNS request comprises a unique authentication package, wherein the unique authentication package comprises encrypted data, in response to receiving the DNS request, initiating a handshaking protocol with the first device, establishing a handshaking session with the first device based on the encrypted data using the handshaking protocol, receiving a query associated with the DNS request, wherein the query is generated using a handshaking algorithm associated with the handshaking protocol, and performing at least one action in response to receiving the query.

19 Claims, 5 Drawing Sheets

(56) References Cited

U.S. PATENT DOCUMENTS

| | | | |
|---|---|---|---|
| 10,291,589 B1* | 5/2019 | Sharifi Mehr | H04L 67/60 |
| 10,454,899 B1* | 10/2019 | Gabrielson | H04L 9/3263 |
| 10,785,021 B1* | 9/2020 | Prabhat | H04L 9/0863 |
| 10,855,440 B1* | 12/2020 | Alwen | H04L 9/0894 |
| 11,336,692 B1* | 5/2022 | McCorkendale | H04L 63/1441 |
| 11,444,753 B1* | 9/2022 | Williams | H04L 9/0852 |
| 11,444,931 B1* | 9/2022 | Quevedo | H04L 63/1458 |
| 11,552,925 B1* | 1/2023 | Craciun | H04L 61/4511 |
| 11,579,783 B1* | 2/2023 | David | H04L 9/14 |
| 11,601,288 B1* | 3/2023 | Bacon | H04L 63/205 |
| 2003/0226017 A1* | 12/2003 | Palekar | H04L 63/0428 713/168 |
| 2003/0229767 A1* | 12/2003 | Lee | G06F 11/2092 711/E12.019 |
| 2004/0093419 A1* | 5/2004 | Weihl | H04L 63/06 709/214 |
| 2004/0172475 A1* | 9/2004 | Tenereillo | H04L 69/163 709/225 |
| 2004/0172528 A1* | 9/2004 | Tenereillo | H04L 63/0428 713/153 |
| 2005/0044352 A1* | 2/2005 | Pazi | H04L 63/1458 713/153 |
| 2005/0063544 A1* | 3/2005 | Uusitalo | H04L 63/306 380/277 |
| 2005/0216736 A1* | 9/2005 | Smith | H04L 63/0823 713/168 |
| 2005/0249219 A1* | 11/2005 | Bajko | H04L 63/166 370/395.2 |
| 2006/0031922 A1* | 2/2006 | Sakai | H04L 63/164 726/1 |
| 2006/0174323 A1* | 8/2006 | Brown | H04L 63/0428 726/3 |
| 2008/0123852 A1* | 5/2008 | Jiang | H04L 9/0891 380/273 |
| 2009/0112814 A1* | 4/2009 | Statia | G06F 16/951 |
| 2011/0258432 A1* | 10/2011 | Rao | H04L 63/10 709/202 |
| 2012/0030466 A1* | 2/2012 | Yamaguchi | H04L 9/3213 713/168 |
| 2012/0036363 A1* | 2/2012 | Langham | H04L 63/164 713/168 |
| 2012/0311691 A1* | 12/2012 | Karlin | H04L 63/0281 726/12 |
| 2013/0022196 A1* | 1/2013 | Kambayashi | H04L 9/0836 380/44 |
| 2013/0312054 A1* | 11/2013 | Wang | H04L 63/166 726/1 |
| 2014/0244998 A1* | 8/2014 | Amenedo | H04L 63/126 713/156 |
| 2015/0106889 A1* | 4/2015 | Sharabani | G06F 16/95 726/5 |
| 2016/0034709 A1* | 2/2016 | Englehardt | G06F 21/6245 726/28 |
| 2016/0044000 A1* | 2/2016 | Cunningham | H04L 9/0825 713/168 |
| 2016/0080395 A1* | 3/2016 | Reddy | H04L 61/5007 726/23 |
| 2016/0192186 A1* | 6/2016 | Lin | H04L 63/061 380/270 |
| 2016/0261576 A1* | 9/2016 | Nivala | H04L 63/062 |
| 2016/0309323 A1* | 10/2016 | Zarakas | G06Q 20/3829 |
| 2016/0373412 A1* | 12/2016 | MacCarthaigh | H04L 63/0428 |
| 2017/0139795 A1* | 5/2017 | Komano | H04L 63/1425 |
| 2017/0142123 A1* | 5/2017 | Komano | H04L 9/0825 |
| 2017/0187733 A1* | 6/2017 | Ahn | H04L 61/4511 |
| 2017/0201810 A1* | 7/2017 | Anderson | H04L 63/0428 |
| 2017/0272941 A1* | 9/2017 | Hanay | H04W 12/04 |
| 2017/0272944 A1* | 9/2017 | Link, II | H04L 9/0841 |
| 2017/0272945 A1* | 9/2017 | Link, II | H04W 12/041 |
| 2017/0339130 A1* | 11/2017 | Reddy | H04L 63/0823 |
| 2017/0346848 A1* | 11/2017 | Smith | H04W 4/70 |
| 2017/0374548 A1* | 12/2017 | Mason | H04L 63/062 |
| 2018/0176020 A1* | 6/2018 | Mukhopadhyay | H04L 9/302 |
| 2018/0176240 A1* | 6/2018 | Kopp | H04L 9/3263 |
| 2019/0068362 A1* | 2/2019 | Anderson | G06N 5/025 |
| 2019/0116160 A1* | 4/2019 | Bhat | H04L 63/08 |
| 2019/0124123 A1* | 4/2019 | Higgins | H04L 63/061 |
| 2019/0190961 A1* | 6/2019 | McGrew | H04L 63/1408 |
| 2019/0222600 A1* | 7/2019 | Fehrman | H04W 12/08 |
| 2019/0222986 A1* | 7/2019 | Aitken | H04W 12/06 |
| 2019/0229900 A1* | 7/2019 | Khristi | H04L 9/0827 |
| 2019/0245700 A1* | 8/2019 | Dobre | H04L 67/1097 |
| 2019/0306166 A1* | 10/2019 | Konda | H04W 12/73 |
| 2019/0356694 A1* | 11/2019 | Wang | H04L 63/0823 |
| 2019/0386984 A1* | 12/2019 | Thakkar | H04L 63/18 |
| 2020/0008251 A1* | 1/2020 | Cheung | H04W 12/06 |
| 2020/0043271 A1* | 2/2020 | Anderson | G07C 9/00309 |
| 2020/0044837 A1* | 2/2020 | Bos | H04W 12/041 |
| 2020/0053103 A1* | 2/2020 | Rehak | H04L 63/0428 |
| 2020/0137093 A1* | 4/2020 | Janakiraman | H04L 63/0263 |
| 2020/0162904 A1* | 5/2020 | Jiang | H04L 63/1475 |
| 2020/0177564 A1* | 6/2020 | Arisankala | H04L 9/0861 |
| 2020/0219005 A1* | 7/2020 | Valdez | G06N 20/20 |
| 2020/0236104 A1* | 7/2020 | Konda | H04L 9/0844 |
| 2020/0285726 A1* | 9/2020 | Kalous | G07C 9/00182 |
| 2020/0287894 A1* | 9/2020 | Leon | H04L 9/3213 |
| 2020/0374314 A1* | 11/2020 | Kampanakis | H04L 63/101 |
| 2021/0029074 A1* | 1/2021 | Buck | H04L 63/0236 |
| 2021/0067455 A1* | 3/2021 | Lahtiranta | H04L 47/2483 |
| 2021/0105151 A1* | 4/2021 | Ngo | H04L 63/166 |
| 2021/0112040 A1* | 4/2021 | Niemi | H04L 63/0485 |
| 2021/0136037 A1* | 5/2021 | Balasubramaniam | H04L 61/4511 |
| 2021/0152526 A1* | 5/2021 | Kohout | H04L 41/12 |
| 2021/0218714 A1* | 7/2021 | Wang | H04L 63/0428 |
| 2021/0258350 A1* | 8/2021 | Buck | H04L 61/4511 |
| 2021/0351918 A1* | 11/2021 | Kenyan | H04L 63/20 |
| 2021/0352047 A1* | 11/2021 | Singh | H04L 61/2592 |
| 2022/0103370 A1* | 3/2022 | Alwen | H04L 61/45 |
| 2022/0286494 A1* | 9/2022 | Zheng | H04L 63/0281 |
| 2022/0294610 A1* | 9/2022 | Sabbu | H04L 9/0825 |
| 2022/0303837 A1 | 9/2022 | Park | |
| 2022/0308555 A1* | 9/2022 | Malm | G06K 7/1417 |
| 2022/0309032 A1 | 9/2022 | Gokhale | |
| 2022/0309517 A1 | 9/2022 | Sager | |
| 2022/0311668 A1* | 9/2022 | Shah | H04L 41/0883 |
| 2022/0311742 A1 | 9/2022 | Zuk | |
| 2022/0321528 A1* | 10/2022 | Konda | H04L 61/4511 |
| 2022/0321682 A1 | 10/2022 | Berookhim | |
| 2022/0328021 A1 | 10/2022 | Deering | |
| 2022/0334742 A1 | 10/2022 | Stabrawa | |
| 2022/0335418 A1 | 10/2022 | DeMarinis | |
| 2022/0335435 A1 | 10/2022 | Giobbi | |
| 2022/0337900 A1 | 10/2022 | Sallas | |
| 2022/0337938 A1 | 10/2022 | Wilker | |
| 2022/0338068 A1 | 10/2022 | Feldman | |
| 2022/0342443 A1 | 10/2022 | Sepulveda | |
| 2022/0342993 A1 | 10/2022 | Shear | |
| 2022/0343324 A1 | 10/2022 | Ozvat | |
| 2022/0343725 A1 | 10/2022 | Nelson | |
| 2022/0344042 A1 | 10/2022 | McCrea | |
| 2022/0345524 A1 | 10/2022 | Mitkar | |
| 2022/0345546 A1 | 10/2022 | Shribman | |
| 2022/0345643 A1 | 10/2022 | Braness | |
| 2022/0353233 A1* | 11/2022 | Helfinstine | H04L 61/4511 |
| 2023/0012224 A1* | 1/2023 | Kumar | H04L 63/10 |
| 2023/0023649 A1* | 1/2023 | Sloane | H04W 76/11 |
| 2023/0069337 A1* | 3/2023 | Lee | H04L 67/14 |
| 2023/0098093 A1* | 3/2023 | Hawkes | H04W 12/06 370/338 |
| 2023/0130418 A1* | 4/2023 | Alam | G06F 21/554 726/4 |
| 2023/0231712 A1* | 7/2023 | Liu | H04L 63/0823 713/171 |
| 2023/0269093 A1* | 8/2023 | Ben-Ari | H04L 9/3263 713/175 |

* cited by examiner

SYSTEM AND METHOD FOR ESTABLISHING A SECURE SESSION TO AUTHENTICATE DNS REQUESTS VIA DYNAMICALLY CONFIGURABLE TRUSTED NETWORK INTERFACE CONTROLLERS

BACKGROUND

Conventional systems do not have the capability to restrict requests from unauthorized users or devices from gaining access to device data and/or network data. As such, there exists a need for a system that can effectively authenticate incoming requests.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for establishing a secure session to authenticate Domain Name System (DNS) requests via dynamically configurable trusted network interface controllers. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives a DNS request from a first device, wherein the DNS request comprises a unique authentication package, wherein the unique authentication package comprises encrypted data, in response to receiving the DNS request, initiates a handshaking protocol with the first device, establishes a handshaking session with the first device based on the encrypted data using the handshaking protocol, receives a query associated with the DNS request, wherein the query is generated using a handshaking algorithm associated with the handshaking protocol, and perform at least one action in response to receiving the query.

In some embodiments, performing the at least one action comprises verifying that the query is associated with the handshaking session, verifying that the handshaking session is active, and transmitting a response associated with the DNS request.

In some embodiments, the present invention receives a second DNS request from a second device, determines that the second DNS request is not associated with any active handshaking sessions, and reroutes the second DNS request to a tracking application.

In some embodiments, the present invention collects, via the tracking application, data associated with DNS queries not linked with any of the active handshaking sessions, wherein the data comprises information associated with one or more devices associated with initiation of the DNS queries.

In some embodiments, establishing the handshaking session based on the encrypted data comprises decrypting the encrypted data received from the first device and determining that the decrypted data matches stored data and initiate the handshaking session.

In some embodiments, the present invention enrolls a first network interface controller associated with the first device, wherein enrolling the first network interface controller comprises registering at least one of the handshaking algorithm, the handshaking protocol, and pre-shared authentication keys. In some embodiments, the present invention dynamically changes at least one of the handshaking algorithm, the handshaking protocol, and the pre-shared authentication keys and transmits a notification associated with the change to the first device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
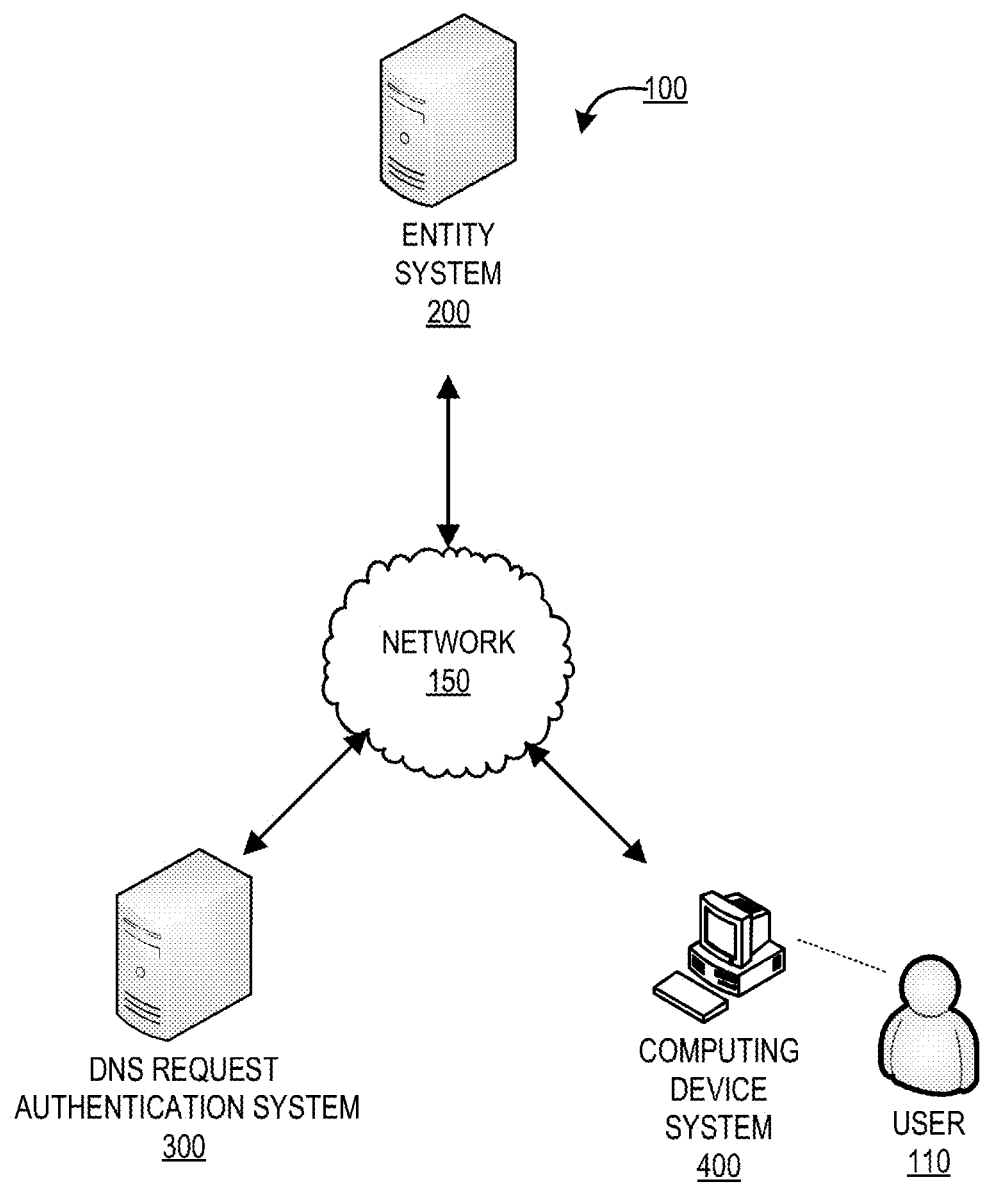
Figure 2:
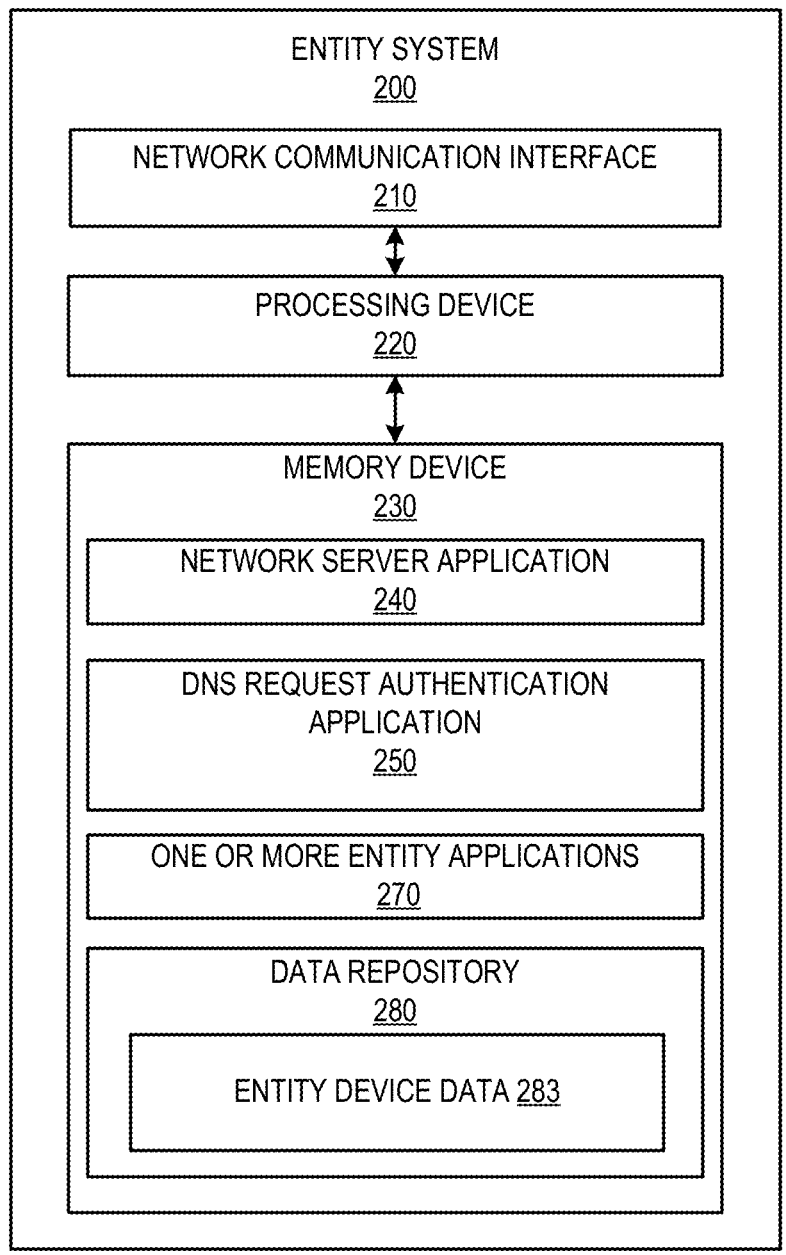
Figure 3:
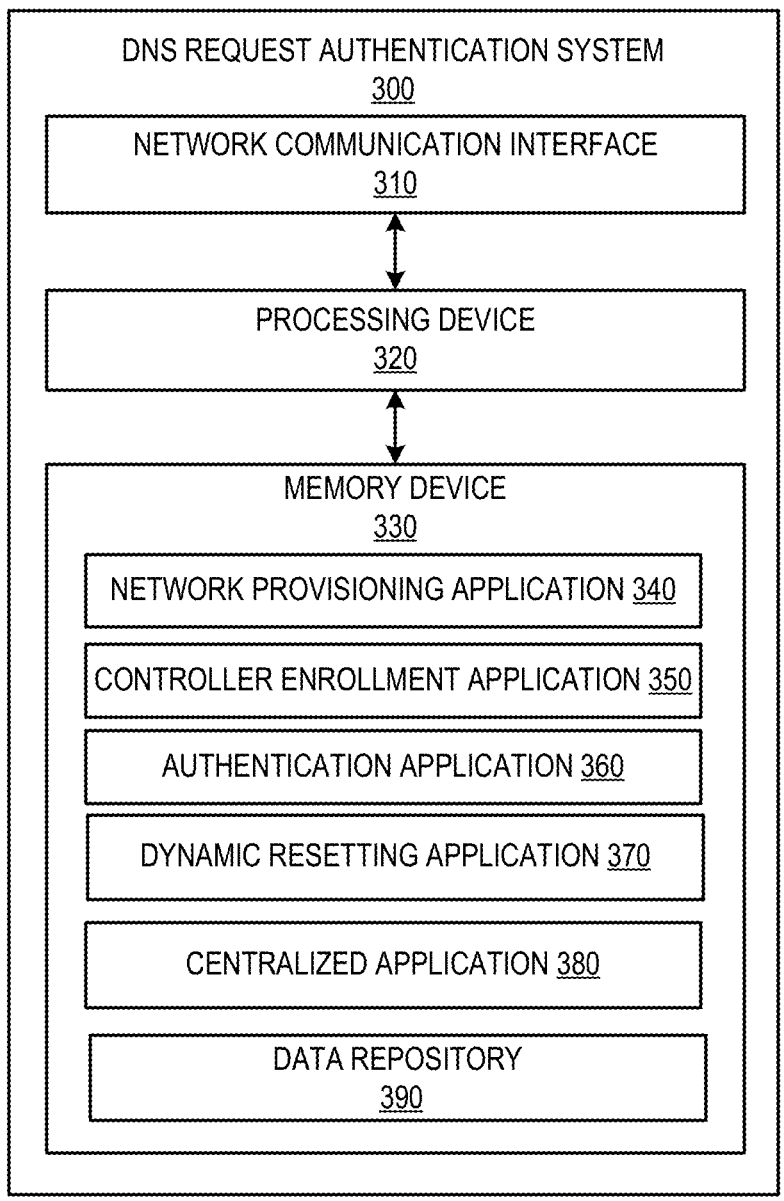
Figure 4:
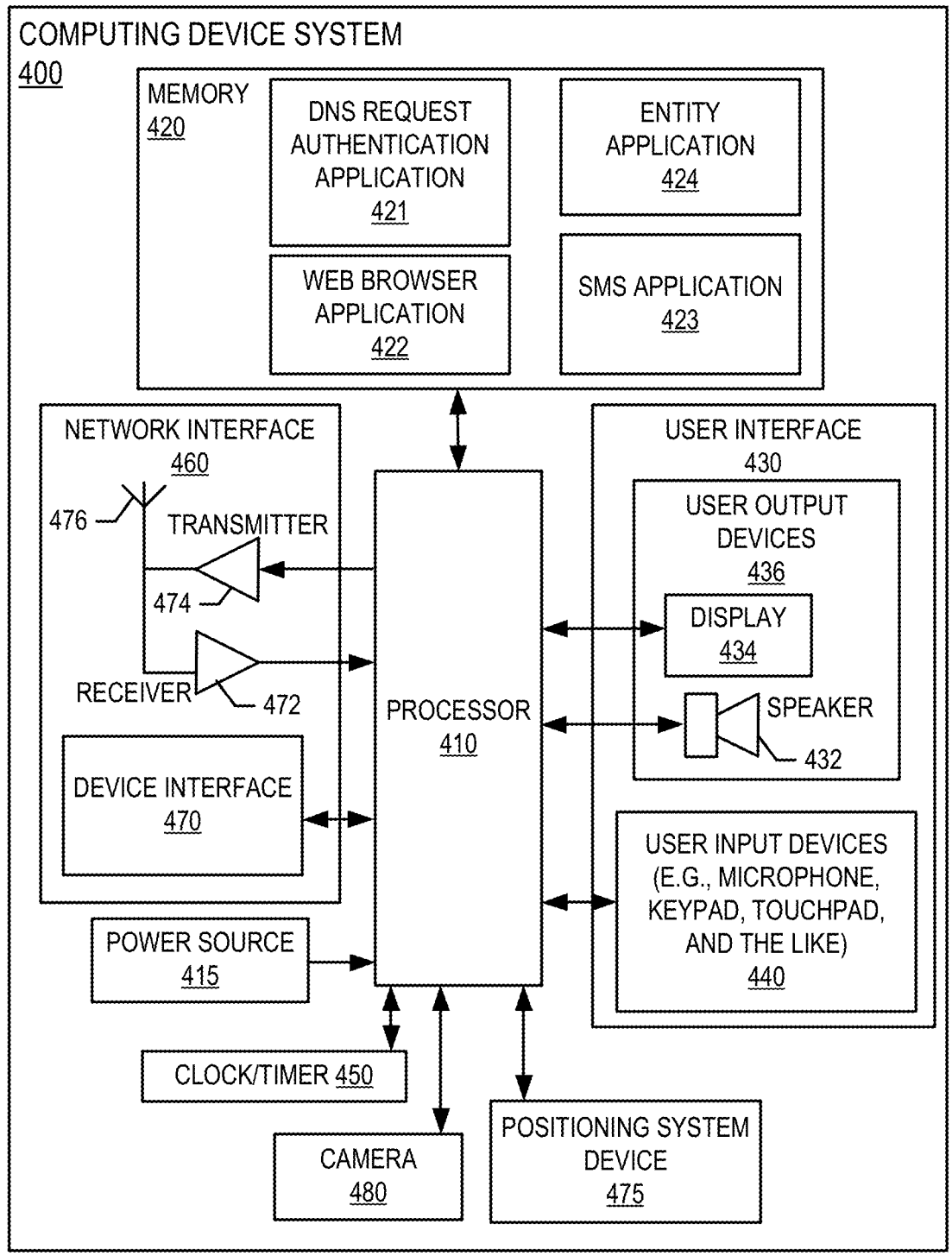
Figure 5:
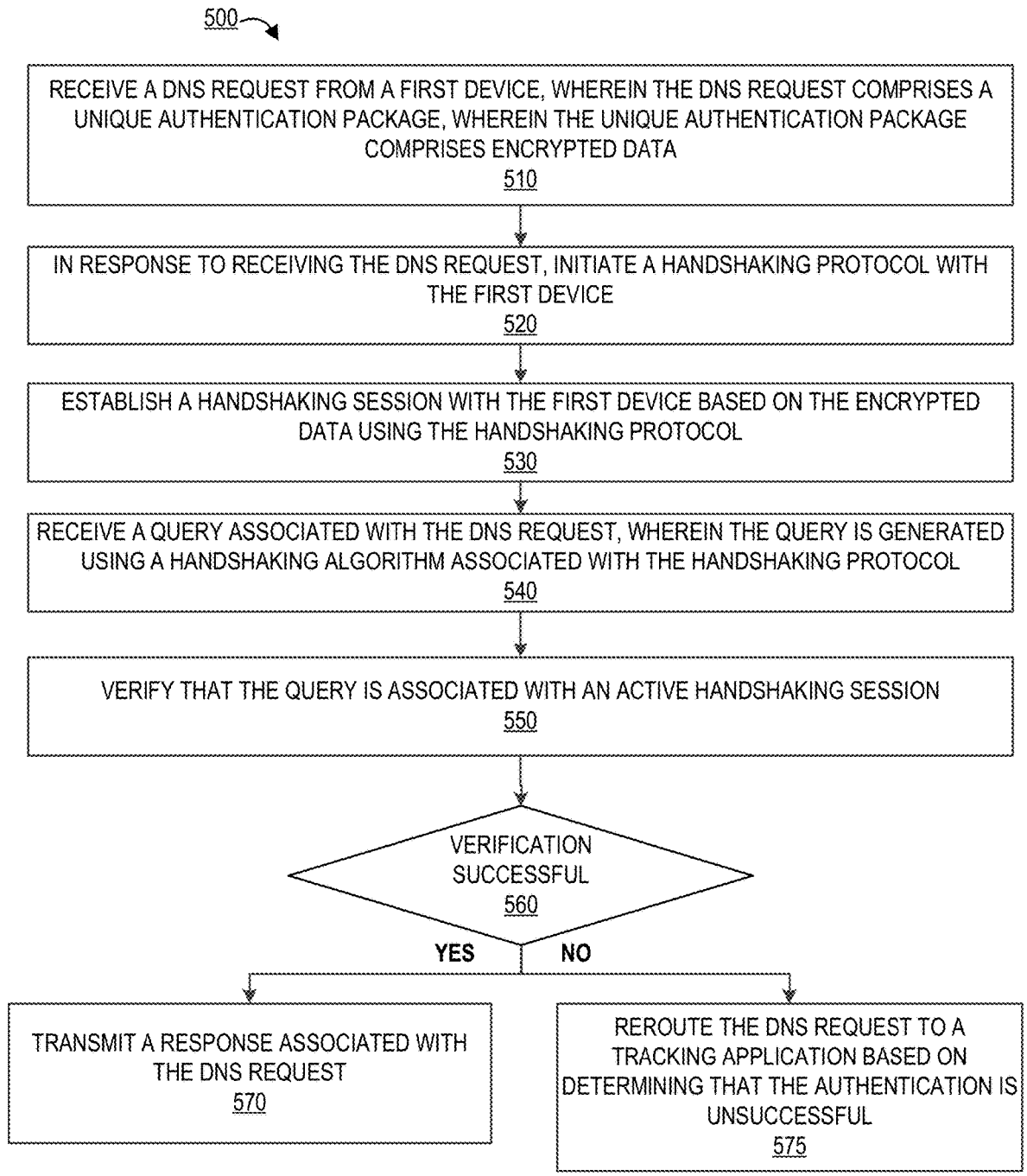

Having thus described embodiments of the invention in general terms, reference will now be made the accompanying drawings, wherein:

FIG. 1 provides a block diagram illustrating a system environment for establishing a secure session to authenticate DNS requests via dynamically configurable trusted network interface controllers, in accordance with an embodiment of the invention;

FIG. 2 provides a block diagram illustrating the entity system 200 of FIG. 1, in accordance with an embodiment of the invention;

FIG. 3 provides a block diagram illustrating a DNS request authentication system 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for establishing a secure session to authenticate DNS requests via dynamically configurable trusted network interface controllers, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications. Applications as described herein may be any software applications configured to perform one or more operations of the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, when a request for information associated with any of the entity systems, servers, file servers, databases, or the like is requested by a device that is internal and/or external to the entity, the request goes to a Domain Name System (DNS) server, where the DNS server provides the requested information (e.g., IP address) to the device that raised the request. Currently, there are no additional security mechanisms in place which prevents unauthorized devices to gain access to the information associated with the entity systems, servers, file servers, databases, etc. As such, any unauthorized devices which can gain access to the internal network can submit requests to the DNS servers, thereby causing loss of sensitive information associated with the entity. The system of the present invention provides technical solutions to overcome these problems as discussed in detail below.

FIG. 1 provides a block diagram illustrating a system environment 100 for establishing a secure session to authenticate DNS requests via dynamically configurable trusted network interface controllers, in accordance with an embodiment of the invention. As illustrated in FIG. 1, the environment 100 includes a DNS request authentication system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., exposure analysts, application developers, application owners, application end users, business analysts, finance agents, or the like) of an entity associated with the entity system 200, where the employees access one or more entity resources (e.g., systems, servers, applications, databases, devices, and/or the like).

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities. In some embodiments, the entity systems 200 may further comprise one or more servers, one or more devices, and/or the like.

The DNS request authentication system 300 is a system of the present invention for performing one or more process steps described herein. In some embodiments, the DNS request authentication system 300 may be an independent system. In some embodiments, the DNS request authentication system 300 may be a part of the entity system 200.

The DNS request authentication system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the DNS request authentication system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the DNS request authentication system 300, and/or entity system 200 across the network 150. In some embodiments, the computing device system 400 may be any device of an employee of the entity.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a DNS request authentication application 250, one or more entity applications 270, and a data repository 280 comprising information associated with entity resource data 283. The one or more entity applications 270 may be any applications developed, supported, maintained, utilized, and/or controlled by the entity. Entity resource data 283 may comprise any data associated with the one or more entity resources of the entity. The computer-executable program code of the network server application 240, the DNS request authentication application 250, the one or more entity application 270 to perform certain logic, data-extraction, and data-storing functions of the entity system 200 described herein, as well as communication functions of the entity system 200.

The network server application 240, the DNS request authentication application 250, and the one or more entity applications 270 are configured to store data in the data repository 280 or to use the data stored in the data repository 280 when communicating through the network communication interface 210 with the DNS request authentication system 300, and/or the computing device system 400 to perform one or more process steps described herein. In some embodiments, the entity system 200 may receive instructions from the DNS request authentication system 300 via the DNS request authentication application 250 to perform certain operations. The DNS request authentication application 250 may be provided by the DNS request authentication system 300. The one or more entity applications 270 may be any of the applications used, created, modified, facilitated, and/or managed by the entity system 200.

FIG. 3 provides a block diagram illustrating the DNS request authentication system 300 in greater detail, in accordance with embodiments of the invention. As illustrated in FIG. 3, in one embodiment of the invention, the DNS request authentication system 300 includes one or more processing devices 320 operatively coupled to a network communication interface 310 and a memory device 330. In certain embodiments, the DNS request authentication system 300 is operated by an entity, such as a financial institution. In some embodiments, the DNS request authentication system 300 is owned or operated by the entity of the entity system 200. In some embodiments, the DNS request authentication system 300 may be an independent system. In alternate embodiments, the DNS request authentication system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the DNS request authentication system 300 described herein. For example, in one embodiment of the DNS request authentication system 300, the memory device 330 includes, but is not limited to, a network provisioning application 340, a controller enrollment application 350, an authentication application 360, a dynamic resetting application 370, a centralized application 380, and a data repository 390 comprising any data processed or accessed by one or more applications in the memory device 330. The computer-executable program code of the network provisioning application 340, the controller enrollment application 350, the authentication application 360, the dynamic resetting application 370, and the centralized application 380 may instruct the processing device 320 to perform certain logic, data-processing, and data-storing functions of the DNS request authentication system 300 described herein, as well as communication functions of the DNS request authentication system 300.

The network provisioning application 340, the controller enrollment application 350, the authentication application 360, the dynamic resetting application 370, and the centralized application 380 are configured to invoke or use the data in the data repository 390 when communicating through the network communication interface 310 with the entity system 200, and/or the computing device system 400. In some embodiments, the network provisioning application 340, the controller enrollment application 350, the authentication application 360, the dynamic resetting application 370, and the centralized application 380 may store the data extracted or received from the entity system 200, and the computing device system 400 in the data repository 390. In some embodiments, the network provisioning application 340, the controller enrollment application 350, the authentication application 360, the dynamic resetting application 370, and the centralized application 380 may be a part of a single application. The functionalities of the network provisioning application 340, the controller enrollment application 350, the authentication application 360, the dynamic resetting application 370, and the centralized application 380 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a DNS request authentication application 421, entity application 424. These applications also typically instructions to a graphical user interface (GUI) on the display 430 that allows the user 110 to interact with the entity system 200, the DNS request authentication system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the DNS request authentication application 421 provided by the DNS request authentication system 300 allows the user 110 to access the DNS request authentication system 300. In some embodiments, the entity application 424 provided by the entity system 200 and the DNS request authentication application 421 allow the user 110 to access the functionalities provided by the DNS request authentication system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for establishing a secure session to authenticate DNS requests via dynamically configurable trusted network interface controllers, in accordance with an embodiment of the invention. In some embodiments, the system of the present invention may act as the DNS server itself. In some embodiments, the system of the present invention may act as an authentication system for DNS servers associated with the entity.

Before initiation of the process flow, the system allows one or more devices (e.g., entity systems, servers, databases, computing device systems, or the like) associated with the entity to enroll Network Interface Controllers (also referred to as network cards) associated with devices of the entity. In some embodiments, the enrollment process may be a self-registration process, where users associated with the devices may perform self-registration via handshaking protocols and identity credentials of the users. In some embodiments, the enrollment process may be performed via a centralized provisioning center provided by the entity, where the centralized provisioning center performs the enrollment of network cards associated with devices and then distributes the trusted enrolled devices to one or more users (e.g., employees) of the entity. The enrollment process establishes the pre-shared authentication keys, and handshaking algorithms and handshaking protocols for establishing a connection with the system of the present invention acting as a DNS server or any DNS server associated with the entity.

As shown in block 510, the system receives a DNS request from a first device, wherein the DNS request comprises a unique authentication package, wherein the unique authentication package comprises encrypted data. In some embodiments, the first device is a computing device of an employee of the entity. In some embodiments, the first device is any internal device associated with the entity. In some embodiments, the system of the present invention may provide a software application (e.g., DNS request authentication application) to the first device that causes the first device to perform one or more actions such as, but not limited to, creating a unique authentication package, generating the DNS request, and transmitting the DNS request. In some embodiments, the software application may cause the first device to encrypt any data associated with the DNS request. After completion of the encryption, the software application may cause the first device to generate the unique authentication package with the encrypted data and transmit the DNS request comprising the unique authentication package. In some embodiments, the encrypted data may comprise handshaking algorithm associated with the handshaking protocol, the pre-shared authentication keys, or the like.

As shown in block 520, the system in response to receiving the DNS request, initiates a handshaking protocol with the first device. In some embodiments, the handshaking algorithm may define the handshaking protocol used for establishing the connection between the system and the first device. In some embodiments, the handshaking protocol may be a three way handshaking protocol. In some embodiments, the handshaking protocol may be a two way handshaking protocol. In some embodiments, each device associated with the entity may be enrolled with a different handshaking protocol during the enrollment process. For example, a device 'A' may be enrolled with a first handshaking algorithm/protocol and device 'B' may be enrolled with a second handshaking algorithm/protocol.

As shown in block 530, the system establishes a handshaking session with the first device based on the encrypted data using the handshaking protocol. The system may establish the handshaking session based on decrypting the encrypted data and determining that the decrypted data matches the stored data associated with the first device, where the stored data is stored in a data repository of the system. In response to determining a successful match, the system may establish the handshaking session. In some embodiments, after establishing the handshaking session, additional data associated with the DNS request may be transmitted by the first device.

As shown in block 540, the system receives a query associated with the DNS request, wherein the query is generated using the handshaking algorithm associated with the handshaking protocol. For example, the query may comprise domain name and host/server name. In some embodiments, the query described in this block may be transmitted along with the DNS request in block 510. As such, the terms 'DNS request' and 'DNS query' may be used interchangeably in such instances. In some embodiments, handshaking algorithm may define the construction of the query. In some embodiments, generating the query using the handshaking algorithm may imply associating the query with the previously established handshaking session and/or transferring information associated with the previously established handshaking session along with the query. In some embodiments, the query may be encrypted by the first device before transmitting the query to the system. The DNS query generated by the first device is different from a regular/standard DNS query because of the contents of the DNS query (e.g., using the handshaking algorithm).

As shown in block 550, the system verifies that the query is associated with an active handshaking session. As shown in block 560, the system determines if the verification successful. If the verification is successful, the process flow proceeds to block 570. As shown in block 570, the system transmits a response associated with the DNS request. For example, the system may return an IP address associated with entity system, device, server, database, or the like involved with the query.

If the verification is not successful, the process flow proceeds to block 575. In some embodiments, the established handshaking session in block 530 may become a timed out session. In such embodiments, the query received by the system will be an invalid query and the verification may fail. In some embodiments, the system may receive one or more DNS queries, where the queries are from devices that are unauthorized (e.g., which did not go through the enrollment process). Such DNS queries cannot go through the handshaking process and therefore cannot generate DNS queries that are recognizable by the system. In such cases, as shown in block 580, the system reroutes the DNS request to a tracking application/server (e.g., honeypot server) based on determining that the authentication is unsuccessful. The tracking application of the system collects data associated with DNS queries not linked with any active handshaking sessions, wherein the data comprises information associated with one or more devices associated with initiation of the DNS queries.

In some embodiments, the system dynamically change at least one of the handshaking algorithm, the handshaking protocol, and the pre-shared authentication keys and transmit a notification associated with the change to the first device, where the updated keys/algorithm/protocol is used by the first device to initiate future DNS requests. In some embodiments, the notification is transmitted through a secure channel. In some embodiments, the notification is transmitted via the centralized provisioning center. Dynamically changing the handshaking algorithm, handshaking protocol, and the pre-shared authentication keys improves the overall security and makes the system robust and less vulnerable to malicious attempts.

In some embodiments, the system provides a centralized management dashboard and reporting tool to one or more users of the entity (e.g., administrators) or specifically to the users of the centralized provisioning center to dynamically change the handshaking algorithm, handshaking protocol, and the pre-shared authentication keys and also to track network requests, traffic patterns, and feed downstream systems. The dashboard provides a way to allow users (e.g., administrators) to track and analyze the unauthorized DNS requests. In some embodiments, the dashboard also allows users to generate reports associated with legit DNS requests and also unauthorized DNS requests that are flagged by the system.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for establishing a secure session to authenticate DNS requests via dynamically configurable trusted network interface controllers, the system comprising:
   at least one network communication interface;
   at least one non-transitory storage device; and
   at least one processing device coupled to the at least one non-transitory storage device and the at least one network communication interface, wherein the at least one processing device is configured to:
receive a DNS request from a first device, wherein the DNS request comprises a authentication package, wherein the authentication package comprises encrypted data;
in response to receiving the DNS request, initiate a handshaking protocol with the first device;
establish a handshaking session with the first device based on the encrypted data using the handshaking protocol;
receive a query associated with the DNS request, wherein the query is generated using a handshaking algorithm associated with the handshaking protocol;
perform at least one action in response to receiving the query;
receive a second DNS request from a second device;
determine that the second DNS request is not associated with any active handshaking sessions; and
reroute the second DNS request to a tracking application.

2. The system of claim 1, wherein performing the at least one action comprises:
verifying that the query is associated with the handshaking session;
verifying that the handshaking session is active; and
transmitting a response associated with the DNS request.

3. The system of claim 1, wherein the at least one processing device is configured to collect, via the tracking application, data associated with DNS queries not linked with any of the active handshaking sessions, wherein the data comprises information associated with one or more devices associated with initiation of the DNS queries.

4. The system of claim 1, wherein establishing the handshaking session based on the encrypted data comprises:
decrypting the encrypted data received from the first device; and
determining that the decrypted data matches stored data and initiate the handshaking session.

5. The system of claim 1, wherein the at least one processing device is configured to:
enroll a first network interface controller associated with the first device, wherein enrolling the first network interface controller comprises registering at least one of the handshaking algorithm, the handshaking protocol, and pre-shared authentication keys.

6. The system of claim 5, wherein the at least one processing device is configured to: dynamically change at least one of the handshaking algorithm, the handshaking protocol, and the pre-shared authentication keys; and
transmit a notification associated with the change to the first device.

7. The system of claim 1, wherein the handshaking protocol is a three way handshaking protocol.

8. The system of claim 1, wherein the handshaking protocol is a two way handshaking protocol.

9. A computer program product for establishing a secure session to authenticate DNS requests via dynamically configurable trusted network interface controllers, the computer program product comprising a non-transitory computer-readable storage medium having computer executable instructions for causing a computer processor to perform the steps of:
receiving a DNS request from a first device, wherein the DNS request comprises a authentication package, wherein the authentication package comprises encrypted data;
in response to receiving the DNS request, initiating a handshaking protocol with the first device;
establishing a handshaking session with the first device based on the encrypted data using the handshaking protocol;
receiving a query associated with the DNS request, wherein the query is generated using a handshaking algorithm associated with the handshaking protocol;
performing at least one action in response to receiving the query;
receiving a second DNS request from a second device;
determining that the second DNS request is not associated with any active handshaking sessions; and
rerouting the second DNS request to a tracking application.

10. The computer program product of claim 9, wherein performing the at least one action comprises:
verifying that the query is associated with the handshaking session;
verifying that the handshaking session is active; and
transmitting a response associated with the DNS request.

11. The computer program product of claim 9, wherein the computer executable instructions cause the computer processor to perform the step of collecting, via the tracking application, data associated with DNS queries not linked with any of the active handshaking sessions, wherein the data comprises information associated with one or more devices associated with initiation of the DNS queries.

12. The computer program product of claim 9, wherein the computer executable instructions cause the computer processor to perform the step of establishing the handshaking session based on the encrypted data based on:
decrypting the encrypted data received from the first device; and
determining that the decrypted data matches stored data and initiate the handshaking session.

13. The computer program product of claim 9, wherein the computer executable instructions cause the computer processor to perform the step of enrolling a first network interface controller associated with the first device, wherein enrolling the first network interface controller comprises registering at least one of the handshaking algorithm, the handshaking protocol, and pre-shared authentication keys.

14. The computer program product of claim 13, wherein the computer executable instructions cause the computer processor to perform the steps of:
dynamically changing at least one of the handshaking algorithm, the handshaking protocol, and the pre-shared authentication keys; and
transmitting a notification associated with the change to the first device.

15. A computer implemented method for establishing a secure session to authenticate DNS requests via dynamically configurable trusted network interface controllers, wherein the method comprises:
receiving a DNS request from a first device, wherein the DNS request comprises a authentication package, wherein the authentication package comprises encrypted data;
in response to receiving the DNS request, initiating a handshaking protocol with the first device;
establishing a handshaking session with the first device based on the encrypted data using the handshaking protocol;
receiving a query associated with the DNS request, wherein the query is generated using a handshaking algorithm associated with the handshaking protocol;

performing at least one action in response to receiving the query;

receiving a second DNS request from a second device;

determining that the second DNS request is not associated with any active handshaking sessions; and rerouting the second DNS request to a tracking application.

16. The computer implemented method of claim 15, wherein performing the at least one action comprises:

verifying that the query is associated with the handshaking session;

verifying that the handshaking session is active; and transmitting a response associated with the DNS request.

17. The computer implemented method of claim 15, wherein establishing the handshaking session based on the encrypted data comprises:

decrypting the encrypted data received from the first device; and determining that the decrypted data matches stored data and initiate the handshaking session.

18. The computer implemented method of claim 15, wherein the method further comprises enrolling a first network interface controller associated with the first device, wherein enrolling the first network interface controller comprises registering at least one of the handshaking algorithm, the handshaking protocol, and pre-shared authentication keys.

19. The computer implemented method of claim 18, wherein the method further comprises:

dynamically changing at least one of the handshaking algorithm, the handshaking protocol, and the pre-shared authentication keys; and transmitting a notification associated with the change to the first device.

* * * * *